United States Patent [19]

Estes

[11] Patent Number: 5,569,080
[45] Date of Patent: Oct. 29, 1996

[54] CROP STRAW FLOW DISRUPTION DEVICE FOR USE ON CROP HARVESTING MACHINE SEPARATION GRATE

[76] Inventor: Don Estes, P.O. Box 397, Flanagan, Ill. 61740

[21] Appl. No.: 499,032

[22] Filed: Jul. 6, 1995

[51] Int. Cl.⁶ .................................................. A01F 12/20
[52] U.S. Cl. ................................................ 460/72; 460/110
[58] Field of Search ....................................... 460/101, 102, 460/71, 72, 108, 109, 110, 107

[56] References Cited

U.S. PATENT DOCUMENTS

| | | | |
|---|---|---|---|
| 923,221 | 6/1909 | Wallschlaeger | 460/110 |
| 952,795 | 3/1910 | Flynn | 460/110 |
| 2,159,664 | 5/1939 | Lindgren | 460/110 |
| 2,457,680 | 12/1948 | Johnson | 460/110 |
| 2,686,523 | 8/1954 | Young | 460/110 |
| 3,092,115 | 6/1963 | Morgan | 460/110 |
| 3,481,344 | 12/1969 | Stokland | 460/71 X |
| 3,515,145 | 6/1970 | Herbsthofer | 460/110 |
| 4,004,404 | 1/1977 | Rowland-Hill et al. | 460/110 |
| 4,909,772 | 3/1990 | Kuchar | 460/71 |
| 4,988,326 | 1/1991 | Bennett | 460/110 |
| 5,035,675 | 7/1991 | Dunn et al. | 460/72 X |
| 5,125,871 | 6/1992 | Gorden | 460/69 |

Primary Examiner—Terry Lee Melius
Attorney, Agent, or Firm—John R. Flanagan

[57] ABSTRACT

A crop straw flow disruption device for installation on a cylindrical grain separation grate of a crop harvesting machine includes a top member adapted for installation on an interior side of the grate, a bottom member adapted for installation on an exterior side of the grate, and a fastener for releasably clamping the top member and bottom member respectively against the interior and exterior sides of the grate and adjacent to one another through an opening in the grate. The top member includes an upright crop engaging portion extending upwardly and outwardly from the interior side of the grate so as to project across and interrupt the path of flow of crop straw about the interior side of the grate to disrupt the occurrence of intertwining of crop straw and thereby the formation and discharge of an elongated rope of crop straw on a harvested field. The grain separation grate includes a plurality of spaced apart transverse curved bars and a plurality of spaced apart longitudinal straight bars defining rows of the openings therebetween and circumferentially spaced from one another around the grate. A plurality of the crop straw flow disruption devices are received through selected ones of the openings in the grate.

19 Claims, 1 Drawing Sheet

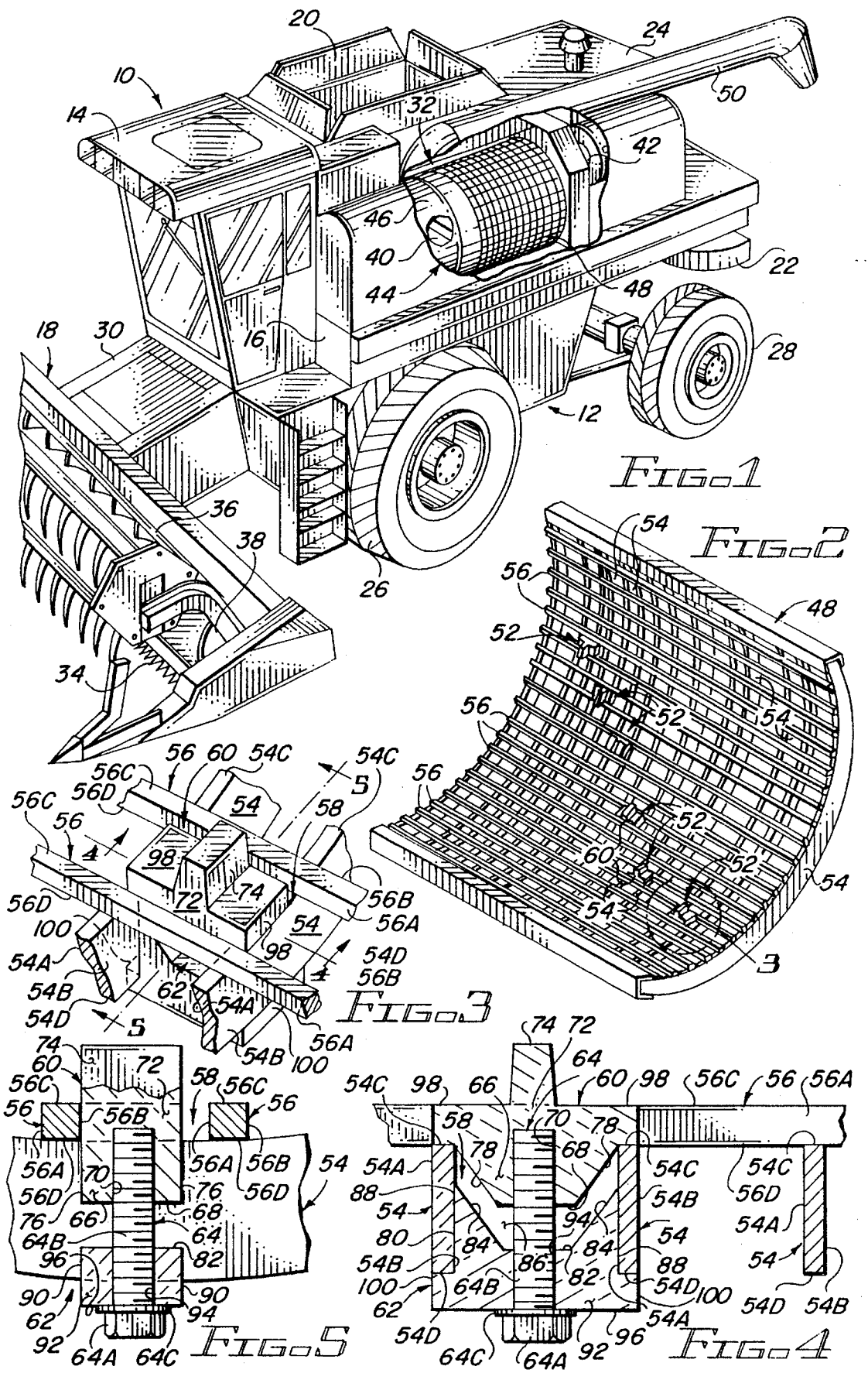

CROP STRAW FLOW DISRUPTION DEVICE FOR USE ON CROP HARVESTING MACHINE SEPARATION GRATE

BACKGROUND OF THE INVENTION

1. Field of the Invention

The present invention generally relates to threshing and separating parts of crops, and, more particularly, is concerned with a crop straw flow disruption device for installation on a cylindrical grain separation grate of a crop harvesting machine.

2. Description of the Prior Art

The threshing and separating actions of crop harvesting machines, such as combines, in the process of harvesting crops present problems for some crops such as certain varieties of soybeans which have tough moist stems that are not ripe or dry when the grain is ripe and ready for harvest. Because the stems are still green and tough, they tend not to break up and separate from one another during the threshing and separating actions.

Under these circumstances the tough moist stems of the crops create a roping effect which may tangle the harvested material together and make it difficult to separate the grain from other parts of the crop. Also, tillage tools working the field the next spring may become pluggged if the ropes of stems or straw are left in the field and the straw has not decayed enough to break up during tillage.

A variety of devices have been developed over the years to facilitate threshing and separating of parts of crops in the harvesting process. Representative examples of these devices are disclosed in U.S. Pat. No. 923,221 to Wallschlaeger, U.S. Pat. No. 952,795 to Flynn, U.S. Pat. No. 2,159,664 to Lindgren, U.S. Pat. No. 2,457,680 to Johnson, U.S. Pat. No. 2,686,523 to Young, U.S. Pat. No. 3,092,115 to Morgan, U.S. Pat. No. 3,515,145 to Herbsthofer, U.S. Pat. No. 4,004,404 to Rowland-Hill et al., U.S. Pat. No. 4,909,772 to Kuchar, U.S. Pat. No. 4,988,326 to Bennett and U.S. Pat. No. 5,125,871 to Gorden.

However, with respect to the above mentioned devices, it appears uncertain that any of them would provide a satisfactory solution for the specific problem associated with soybean and other crops having stems which are not ripe when the grain is ready for harvest. It appears likely that the stems may continue to become intertwined and create a straw rope in the field as well as reduce the efficiency of the crop harvesting machine in separating the grain from other parts of the crop material.

Consequently, a need remains for a device which is easy to install and will overcome the aforementioned problems without introducing new problems in their place.

SUMMARY OF THE INVENTION

The present invention provides a crop straw flow disruption device for installation on a grain separation grate of a crop harvesting machine designed to satisfy the aforementioned need. The device of the present invention crosses and interrupts the path of flow of the crop straw through the separating section of the crop harvesting machine and, by doing so, disrupts the occurrence of intertwining of the crop straw, especially of some varieties of soybeans which have stems that usually are not ripe when the grain is ready for harvest, and thus avoids the discharge of the same on the field as an elongate rope of crop straw. By preventing the tangling intertwining of the stems or straw, the device also assists the grain separation grate in separating the grain from the stems in the crop harvesting machine.

Accordingly, the present invention is directed to a crop straw flow disruption device for installation on a grain separation grate in a machine for harvesting a crop from a field. The device comprises: (a) a top member adapted for installation on an interior side of the grain separation grate in the crop harvesting machine, the top member including an upright crop engaging portion extending upwardly and outwardly from the interior side of the grain separation grate so as to project across and interrupt the path of flow of crop straw about the interior side of the grate to disrupt the occurrence of intertwining of crop straw and thereby the formation and discharge of an elongated rope of crop straw on the harvested field; (b) a bottom member adapted for installation on an exterior side of the grain separation grate; and (c) a fastener for releasably clamping the top member and bottom member respectively against the interior and exterior sides of the grate and adjacent to one another through an opening in the grate.

More particularly, the top member includes a lower mating portion having an exterior bottom surface and a hole being open at the exterior bottom surface, and an upper clamping portion for positioning against the interior side of the grain separation grate. The upright crop engaging portion is attached to and projects upwardly from the upper clamping portion and outwardly from the interior side of the grate.

The bottom member includes an upper mating portion having an interior top surface defining a cavity therein for receiving the lower mating portion of the top member, and a lower clamping portion for positioning against the exterior side of the grain separation grate. A passageway is defined through the bottom member and is open at opposite ends at the interior top surface of the upper mating portion and at an exterior bottom surface of the lower clamping portion.

The fastener extends through the passageway of the bottom member into the hole in the lower mating portion of the top member for clamping the upper clamping portion of the top member and the lower clamping portion of the bottom member against the interior and exterior sides of the grain separation grate so that the upright crop engaging portion of the top member projects above the upper clamping portion thereof and the interior side of the grain separation grate and across the crop straw flow path. The fastener is externally threaded and the hole in the lower mating portion of the top member is internally threaded for receiving the externally threaded fastener.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a fragmentary side perspective view of a crop harvesting machine showing particularly the location of a cylindrical grain separation grate upon which is installed the crop straw flow disruption devices of the present invention.

FIG. 2 is an enlarged interior perspective view of a plurality of the crop straw flow disruption devices installed on a portion of the grain separation grate.

FIG. 3 is an enlarged detailed perspective view of the area enclosed by circle 3 of FIG. 2.

FIG. 4 is a transverse cross-sectional view of the crop straw flow disruption device installed on the grain separation grate taken along line 4—4 of FIG. 3.

FIG. 5 is a longitudinal cross-sectional view of the crop straw flow disruption device installed on the grain separation grate taken along line 5—5 of FIG. 3.

DETAILED DESCRIPTION OF THE INVENTION

IN GENERAL

Referring to the drawings, and particularly to FIG. 1, there is illustrated a crop harvesting machine, generally designated 10, which in the illustrated embodiment is a conventionally well-known rotor-type combine. The combine 10 includes a mobile chassis 12 and has an operator's cab 14, a main housing 16, a crop cutting and gathering header 18, a grain storage bin 20, a rear discharge compartment 22, and an engine compartment 24, all supported by the chassis 12.

All of the moving elements of the combine 10 are driven by an internal combustion engine located within the engine compartment 24. The engine, being of substantial horsepower, is adapted not only to drive all of the moving components of the combine 10 but also is capable of operating the front drive wheels 26 of the combine 10 which together with the rear wheels 28 render the combine self-propelled.

The combine 10 harvests grain from a standing crop, such as soybeans or the like, by first severing the crop stalks or stems from the field and then gathering and feeding the grain-bearing severed stems from the header 18 through a crop elevator 30 to a crop threshing and separating mechanism 32 operatively mounted in the main housing 16.

The header 18 is mounted transversely across the forward end of the crop elevator 30 and is operable to cut and gather the crop as the combine 10 is driven across the field. The crop header 18 typically employs a cutterbar 34, a rotatable reel 36, and a conveying auger 38. All of these components extend transversely to the path of movement of the combine 10 through the field and are operable for severing the crop stems relatively close to the ground and gathering and consolidating the severed crop stems for discharge rearwardly to the crop elevator 30.

The crop threshing and separating mechanism 32 includes an elongated cylindrical rotor 40 mounted on a central shaft 42 rotatably mounted at forward and aft ends to the frame of the main housing 16 of the combine 10. The rotor 40 and its shaft 42 are so mounted for rotation within and relative to a stationary outer cage 44 having a forward cylindrical threshing concave 46 and a rearward cylindrical grain separation grate 48. The mechanism 32 receives the grain-bearing severed crop stems from the crop elevator 30 and harvests grain from the severed stems by first threshing the stems between the rotating rotor 40 and the stationary outer threshing concave 46 and finally separating the grain from the threshed stems between the rotating rotor 40 and the stationary outer grain separation grate 48. Thereafter, the threshed and separated stems along with other waste material are discharged back on the harvested field through the rear discharge compartment 22. The separated grain, in turn, is conveyed within the machine to the grain storage bin 20 for later transfer from the combine 10 by an unloading auger 50 connected to the storage bin 20.

As discussed earlier, the threshing and separating actions of the mechanism 32 of the combine 10 present problems in the harvesting of some types of crops such as certain varieties of soybeans which have tough moist stems that are not ripe or dry when the grain is ripe and ready for harvest. Because the stems are still green and tough, they tend not to break up and separate from one another during the threshing and separating actions and instead become intertwined and form an elongated rope of crop straw which is discharged back onto the harvested field, presenting clogging problems for tillage tools which are used to prepare the ground for planting crops during the following spring.

CROP STRAW FLOW DISRUPTION DEVICES

Referring to FIG. 2, there is illustrated a plurality of crop straw flow disruption devices of the present invention, generally designated 52, installed on a section of the cylindrical grain separation grate 48 of the mechanism 32 of the conventional combine 10 for overcoming the problems associated with the harvesting of crops having tough moist unripen crop stems. The grain separation grate 48 includes a plurality of spaced apart rigid transverse curved bars 54 and a plurality of spaced apart rigid longitudinal straight bars 56.

The transverse curved bars 54 are substantially rectangular in cross-section and arranged in substantially parallel relation to one another. Each of the transverse curved bars 54 has a pair of opposite side surfaces 54A, 54B and a pair of opposite interior and exterior surfaces 54C, 54D. The longitudinal straight bars 56 are substantially rectangular in cross-section and arranged in substantially parallel relation to one another. The longitudinal straight bars 56 are mounted interiorly of and to and in substantially perpendicular relation to the transverse curved bars 54. Each of the longitudinal straight bars 56 has a pair of opposite side surfaces 56A, 56B and a pair of opposite interior and exterior surfaces 56C, 56D. The pluralities of spaced apart transverse curved bars 54 and longitudinal straight bars 56, arranged in a crisscross relation with respect to each other, define a plurality of rows of openings 58 through the grate 48 being circumferentially spaced from one another around the grate 48. The exterior surfaces 54D of the transverse curved bars 54 define the exterior side of the grate 48 whereas the interior surfaces 56C of the longitudinal straight bars 56 define the interior side of the grate 48. The transverse curved bars 54 and longitudinal straight bars 56 are each made of a suitable substantially rigid material.

Referring now to FIGS. 3 to 5, each of the flow disruption devices 52 of the present invention includes a top member 60 adapted for installation on the interior side of the grain separation grate 48, a bottom member 62 adapted for installation on the exterior side of the grate 48, and a fastener 64 for releasably clamping the top member 60 and bottom member 62 respectively against the interior and exterior sides of the grate 48 and adjacent to one another through one of the openings 58 in the grate 48. The top member 60, the bottom member 62, and the fastener 64 of each device 52 are each made substantially of a rigid material. The top member 60 is installed from the exterior side of the grate 48 as are both the bottom member 62 and fastener 64. The top member 60 is first inserted through one of the openings 58. The fastener 64 of each device 52 has a head portion 64A and an elongated cylindrical screw portion 64B which is externally threaded. The head portion 64A is enlarged in diameter relative to the screw portion 64B. The fastener 64 also includes an annular washer 64C which fits over the screw portion 64B and rests against an inner side of the head portion 64A of the fastener 64.

The top member 60 of each device 52 particularly includes a lower mating portion 66 having an exterior bottom surface 68 and a central hole 70 being open at the exterior bottom surface 68 and an upper clamping portion 72 for positioning against the interior side of the grain separation grate 48 and being attached to and extending from the lower mating portion 66. The top member 60 also includes an upright crop engaging portion 74 attached to and projecting upwardly from a central location on the upper clamping portion 72 and outwardly from the interior side of the grate 48 so as to project across and interrupt the path of flow of crop straw about the interior side of the grate 48 to disrupt the occurrence of intertwining of crop straw and thereby the formation and discharge of an elongated rope of crop straw on the harvested field. The upright crop engaging portion 74 disrupts the intertwining of the crop straw such as by cutting the crop straw into pieces.

More particularly, the lower mating portion 66 of the top member 60 further has a pair of opposite exterior side surfaces 76 extending upwardly from and in substantially perpendicular relation to the exterior bottom surface 68 of the lower mating portion 66 and in substantially parallel relation to one another, and a pair of opposite exterior end surfaces 78 extending in oppositely inclined relation upwardly and outwardly from the exterior bottom surface 68 and between the opposite exterior side surfaces 76. The central hole 70 in the lower mating portion 66 of the top member 60 is also internally threaded and has only a slightly greater diameter than that of the elongated screw portion 64B of the fastener 64 for threadably receiving the externally threaded screw portion 64B of the fastener 64 therein.

The bottom member 14 of each device 52 particularly includes an upper mating portion 80 having an interior top surface 82 and a pair of interior end surfaces 84 extending in oppositely inclined relation upwardly and outwardly from the interior top surface 82 to define therewith a cavity 86 in the upper mating portion 80 for receiving the lower mating portion 66 of the top member 60. The upper mating portion 80 also has a pair of opposite exterior end surfaces 88 extending parallel to one another and a pair of opposite exterior side surfaces 90 extending parallel to one another.

The bottom member 62 also includes a lower clamping portion 92 for positioning against the exterior side of the grain separation grate 48 and being attached to and extending from the upper mating portion 80. The lower clamping portion 92 defines a passageway 94 through the bottom member 62 being open at opposite ends at respectively the interior top surface 82 of the upper mating portion 80 and at an exterior bottom surface 96 of the lower clamping portion 92.

The upper clamping portion 72 of the top member 60 further has a pair of opposite end flanges 98 extending outwardly beyond the opposite exterior end surfaces 78 of the lower mating portion 66 of the top member 60 for positioning the upper clamping portion 72 of the top member 60 against the interior side of the grate 48. The lower clamping portion 92 of the bottom member 62 further has a pair of opposite end flanges 100 extending outwardly beyond the opposite exterior end surfaces 88 of the upper mating portion 80 of the bottom member 62 for positioning the lower clamping portion 92 of the bottom member 62 against the exterior side of the grate 48. The screw portion 64B of the fastener 64 extends through the passageway 94 of the bottom member 62 and threads into the central hole 70 in the lower mating portion 66 of the top member 60 for releasably clamping the respective end flanges 98, 100 of the top member 60 and bottom member 62 respectively against the interior and exterior sides of the grate 48 with the top member 60 and bottom member 62 partially extending through the one of the openings 58 in the grate 48 so that the upright crop engaging portion 74 of the top member 60 extends above the interior side of the grate 48 and across the crop straw flow path.

Therefore, the top member 60 of each device 52 is adapted for installation on the interior side of the grate 48 between an adjacent pair of the transverse curved bars 54 and an adjacent pair of the longitudinal straight bars 56 and extending into the opening 58 defined therebetween. The lower mating portion 66 of the top member 60 is positioned partially through the opening 58 between the side surfaces 54A, 54B of the adjacent pair of the transverse curved bars 54 and the side surfaces 56A, 56B of the adjacent pair of the longitudinal straight bars 56. The end flanges 98 of the upper clamping portion 72 of the top member 60 are positioned against the interior surfaces 54C of the adjacent pair of transverse curved bars 54. The upright crop engaging portion 74 of the top member 60 projects outwardly from the longitudinal straight bars 56 for disrupting the flow of crop straw. The bottom member 62 of each device 52 is adapted for installation on the exterior side of the grate 48 between the adjacent pair of the same transverse curved bars 54 and the adjacent pair of the same longitudinal straight bars 56. The upper mating portion 80 of the bottom member 62 is positioned partially through the opening 58 between the side surfaces 54A, 54B of the adjacent pair of the transverse curved bars 54. The end flanges 100 of the lower clamping portion 92 of the bottom member 62 is positioned against the exterior surfaces 54D of the adjacent pair of transverse curved bars 54. The fastener 64 extends through the passageway 94 of the bottom member 62 and threadably into the threaded hole 70 of the top member 60 for releasably clamping the upper clamping portion 72 of the top member 60 and the lower clamping portion 92 of the bottom member 62 against the interior and exterior surfaces 54C, 54D of the transverse curved bars 56 of the grain separation grate 48 so that the upright crop engaging portion 74 of the top member 60 is stationarily and fixedly supported to project outwardly from the interior surfaces 56C of the longitudinal straight bars 56 and extend across the crop straw flow path to interrupt the flow of crop straw and cut the straw. In one example of the device 52, the upright crop engaging portion 74 projects inwardly ⅝ inch above the straight bars 56 of the grate 48 and is ⅜ inch wide. As can be readily seen in FIG. 2, the devices 52 are disposed in selected ones of the openings 58 of the grain separation grate 48 and are preferably disposed diagonally across the grate 48. Arrangement of the devices 54 in other patterns is equally within the purview of the present invention.

It is thought that the present invention and its advantages will be understood from the foregoing description and it will be apparent that various changes may be made thereto without departing from the scope of the invention or sacrificing all of its material advantages, the form hereinbefore described being merely preferred or exemplary embodiment thereof.

I claim:

1. A crop straw flow disruption device for installation on a grain separation grate of a machine for harvesting a crop from a field, said device comprising:

(a) a top member adapted for installation on an interior side of a grain separation grate in a crop harvesting machine, said top member including an upright crop engaging portion for extending upwardly and outwardly from the interior side of the grain separation grate so as to project across and interrupt the path of flow of crop straw about the interior side of the grate to disrupt the occurrence of intertwining of crop straw and thereby the formation and discharge of an elongated rope of crop straw on a harvested field, said top member also including a lower mating portion having an exterior bottom surface and a hole being open at said exterior bottom surface, said top member further including an upper clamping portion for positioning against the interior side of the grain separation grate, said upper clamping portion of said top member being attached to and extending from said lower mating portion thereof, said upright crop engaging portion of said top member being attached to and projecting upwardly from said upper clamping portion thereof for projecting outwardly from the interior side of the grate;

(b) a bottom member adapted for installation on an exterior side of the grain separation grate; and (c) a fastener for releasably clamping said top member and said bottom member respectively against the interior and exterior sides of the grate and adjacent to one another through an opening in the grate.

2. The device of claim 1 wherein said lower mating portion of said top member further has a pair of opposite exterior side surfaces extending upwardly from and in substantially perpendicular relation to said exterior bottom surface and in substantially parallel relation to one another, and a pair of opposite exterior end surfaces extending in oppositely inclined relation upwardly and outwardly from said exterior bottom surface and between said opposite exterior side surfaces.

3. The device of claim 1 wherein said upper clamping portion of said top member has a pair of opposite end flanges extending outwardly beyond said exterior oppositely inclined end surfaces of said lower mating portion for positioning against the interior side of the grain separation grate.

4. The device of claim 1 wherein said bottom member includes:

an upper mating portion having an interior top surface defining a cavity therein for receiving said lower mating portion of said top member; and a lower clamping portion for positioning against the exterior side of the grain separation grate and being attached to and extending from said upper mating portion, said lower clamping portion having means defining a passageway through said bottom member being open at opposite ends at said interior top surface of said upper mating portion and at an exterior bottom surface of said lower clamping portion.

5. The device of claim 4 wherein said upper mating portion of said bottom member further has a pair of opposite interior end surfaces extending in oppositely inclined relation upwardly and outwardly from said interior top surface, a pair of opposite exterior end surfaces extending parallel to one another, and a pair of opposite exterior side surfaces extending parallel to one another, said pair of interior end surfaces and said interior top surface defining said cavity therein for receiving said lower mating portion of said top member.

6. The device of claim 4 wherein said lower clamping portion of said bottom member has a pair of opposite end flanges extending outwardly beyond said opposite exterior end surfaces of said upper mating portion for positioning against the exterior side of the grain separation grate.

7. The device of claim 4 wherein said fastener is an elongated member extending through said passageway of said bottom member and into said hole of the lower mating portion of said top member for clamping said upper clamping portion of said top member and said lower clamping portion of said bottom member against the interior and exterior sides of the grain separation grate so that said upright crop engaging portion of said top member projects above said upper clamping portion thereof and the interior side of the grain separation grate and across the crop straw flow path.

8. The device of claim 7 wherein said elongated member of said fastener is externally threaded.

9. The device of claim 8 wherein said hole in said lower mating portion of said top member is internally threaded for receiving said externally threaded elongated member of said fastener.

10. A crop straw flow disruption device for installation on a cylindrical grain separation grate of a machine for harvesting a crop from a field, said device comprising:

(a) a top member adapted for installation on an interior side of a grain separation grate in a crop harvesting machine, said top member including (i) a lower mating portion having an exterior bottom surface, a pair of opposite exterior side surfaces extending upwardly from and in substantially perpendicular relation to said exterior bottom surface and in substantially parallel relation to one another, a pair of opposite exterior end surfaces extending in oppositely inclined relation upwardly and outwardly from said exterior bottom surface and between said opposite exterior side surfaces, and a central hole being open at said exterior bottom surface, (ii) an upper clamping portion having a pair of opposite end flanges extending outwardly beyond said exterior oppositely inclined end surfaces of said lower mating portion being for positioning against the interior side of the grain separation grate, and (iii) an upright crop engaging portion extending upwardly from a central location on said upper clamping portion and outwardly from the interior side of the grain separation grate so as to project across and interrupt the path of flow of crop straw about the interior side of the grate to disrupt the occurrence of intertwining of crop straw and thereby the formation and discharge of an elongated rope of crop straw on a harvested field;

(b) a bottom member adapted for installation on an exterior side of the grain separation grate, said bottom member including (i) an upper mating portion having an interior top surface, a pair of opposite interior end surfaces extending in oppositely inclined relation upwardly and outwardly from said interior top surface so as to define a cavity therein for receiving said lower mating portion of said top member, a pair of opposite exterior end surfaces extending parallel to one another, and a pair of opposite exterior side surfaces extending parallel to one another and coplanar respectively with said opposite exterior side surfaces of said lower mating portion of said top member when said lower mating portion of said top member is inserted in said cavity in said upper mating portion of said bottom member, (ii) a lower clamping portion having a pair of opposite end flanges extending outwardly beyond said opposite exterior end surfaces of said upper mating portion for positioning against the exterior side of the grain separation grate, and (iii) means defining a passageway through said bottom member being open at opposite ends at said interior top surface of said upper mating portion and at an exterior bottom surface of said lower clamping portion; and (c) a fastener extending through said passageway of said bottom member into said central hole in said lower mating portion of said top member for clamping said upper clamping portion of said top member and said lower clamping portion of said bottom member against the interior and exterior sides of the grain separation grate so that said upright crop engaging portion of said top member projects above said upper clamping portion thereof and the interior side of the grain separation grate and across the crop straw flow path.

11. The device of claim 10 wherein said fastener is externally threaded.

12. The device of claim 11 wherein said central hole in said lower mating portion of said top member is internally threaded for receiving said externally threaded fastener.

13. A grain separation apparatus for use in a crop harvesting machine, said apparatus comprising:

(a) a grain separation grate having an interior side and an opposite exterior side, said grate including (i) a plurality of spaced apart transverse curved bars disposed in substantially parallel relation to one another, each of said curved bars having a pair of opposite side surfaces and a pair of opposite interior and exterior surfaces, and (ii) a plurality of spaced apart longitudinal straight bars disposed in substantially parallel relation to one another and mounted to and in substantially perpendicular relation to said transverse curved bars, each of said straight bars having a pair of opposite side surfaces and a pair of opposite interior and exterior surfaces, said plurality of spaced apart longitudinal straight bars and said transverse curved bars defining a plurality of rows of openings being circumferentially spaced from one another around said grate; and (b) a plurality of crop straw flow disruption devices being disposed in selected ones of said openings of said grate, each of said devices including (i) a top member adapted for installation on an interior side of said grain separation grate between an adjacent pair of said transverse curved bars and an adjacent pair of said longitudinal straight bars and extending into said opening therebetween, said top member including an upright crop engaging portion extending upwardly and outwardly from said interior side of said grain separation grate so as to project across and interrupt the path of flow of crop straw about said interior side of the grate to disrupt the occurrence of intertwining of crop straw and thereby the formation and discharge of an elongated rope of crop straw on a harvested field, (ii) a bottom member adapted for installation on an exterior side of the grain separation grate between said adjacent pair of transverse curved bars and said adjacent pair of said longitudinal straight bars and extending into said opening therebetween, and (iii) a fastener extending into said opening between said adjacent pair of transverse curved bars and said adjacent pair of said longitudinal straight bars and engaged with said top and bottom members for releasably clamping said top member and said bottom member respectively against said interior and exterior sufaces of said adjacent pair of transverse curved bars of said grate and adjacent to one another through said opening in said grate.

14. The apparatus of claim 13 wherein said top member of each of said devices also includes:

a lower mating portion having an exterior bottom surface and a hole being open at said exterior bottom surface, said lower mating portion being positioned partially through said opening between said adjacent pair of transverse curved bars and said adjacent pair of longitudinal straight bars; and an upper clamping portion for positioning against the interior surfaces of said adjacent pair of said transverse curved bars of said grate, said upper clamping portion being attached to and extending from said lower mating portion, said upright crop engaging portion attached to and projecting upwardly from said upper clamping portion and outwardly from the interior side of the grate.

15. The apparatus of claim 14 herein said bottom member of each of said devices includes:

an upper mating portion having an interior top surface defining a cavity therein for receiving said lower mating portion of said top member, said upper mating portion being positioned partially through said opening between said adjacent pair of transverse curved bars and said adjacent pair of longitudinal straight bars; and a lower clamping portion for positioning against said exterior surfaces of said adjacent pair of transverse curved bars of said grate and being attached to and extending from said upper mating portion, said lower clamping portion having means defining a passageway through said bottom member being open at opposite ends at said interior top surface of said upper mating portion and at an exterior bottom surface of said lower clamping portion.

16. The apparatus of claim 15 wherein said fastener of each of said devices is an elongated member extending through said passageway of said bottom member and into said hole of the lower mating portion of said top member for clamping said upper clamping portion of said top member and said lower clamping portion of said bottom member against the interior and exterior sides of the grain separation grate so that said upright crop engaging portion of said top member projects above said upper clamping portion thereof and said interior surfaces of said longitudinal straight bars at said interior side of said grate and across the crop straw flow path.

17. The apparatus of claim 16 wherein said elongated member of said fastener of each of said devices is externally threaded.

18. The apparatus of claim 17 wherein said hole in said lower mating portion of said top member of each of said devices is internally threaded for receiving said externally threaded elongated member of said fastener.

19. The apparatus of claim 13 wherein said crop straw flow disruption devices are disposed diagonally across said grate in selected ones of said openings of said grate.

* * * * *